(No Model.)
J. PEHRSON.
HARROW.
No. 462,059.   Patented Oct. 27, 1891.
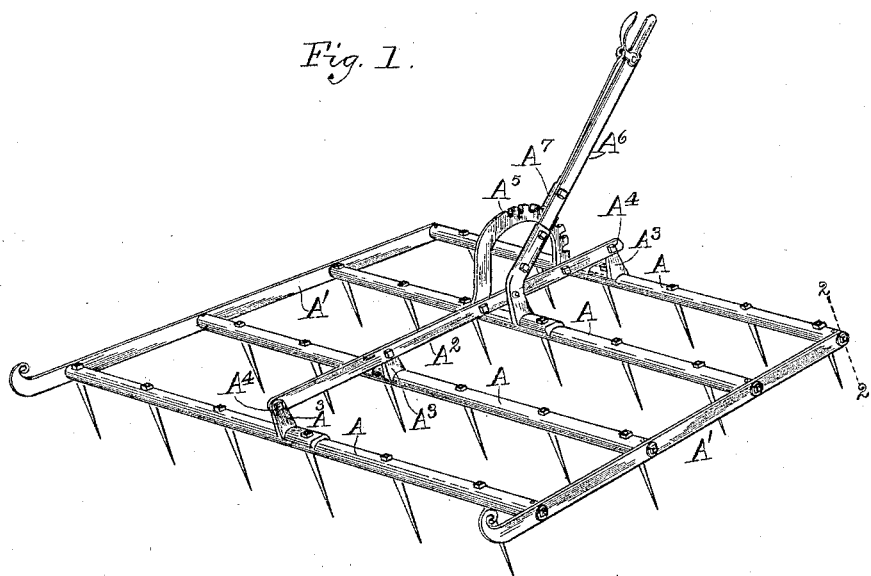
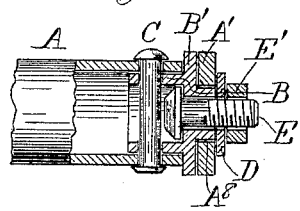
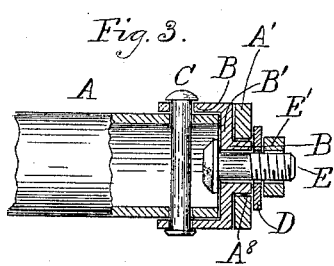
Witnesses:
E. F. Dowling
H. E. Hollister
Inventor:
John Pehrson,
per L. L. Morrison,
Attorney.

UNITED STATES PATENT OFFICE.

JOHN PEHRSON, OF ROCKFORD, ILLINOIS.

HARROW.

SPECIFICATION forming part of Letters Patent No. 462,059, dated October 27, 1891.

Application filed October 1, 1890. Serial No. 366,791. (No model.)

*To all whom it may concern:*

Be it known that I, JOHN PEHRSON, a citizen of the United States, residing at Rockford, in the county of Winnebago and State of Illinois, have invented certain new and useful Improvements in Harrows, of which the following is a specification.

This invention relates to improved means for coupling together the beams and cross-beams of adjustable lever harrows; and it consists of certain new and useful features of construction and combinations of parts hereinafter described, and pointed out in the claims.

Referring to the accompanying drawings, which form a part of this specification, Figure 1 is an isometric view of a section of a harrow embodying my invention. Fig. 2 is a vertical section at the dotted line 2 2 in Fig. 1 of the parts there shown. Fig. 3 is a like view of a modified equivalent form of the parts shown in Fig. 2.

Like letters of reference indicate corresponding parts throughout the several views.

A are tubular harrow-beams of the usual form.

A' are cross-beams for connecting the harrow-beams A together.

$A^2$ is a tilting beam connected with the cross-beams A' by means of standards $A^3$ and bolts $A^4$.

$A^5$ is a segment-rack rigidly secured to the tilting beam $A^4$.

$A^6$ is a tilting lever fast to one of the beams A and adapted to engage with the segment-rack $A^5$ by means of a detent $A^7$.

B is a cylindrical tubular coupling of diminished diameter at its outer end rigidly secured to the end of the harrow-beam A by means of a rivet C passed therethrough, provided with a transverse annular flange B', projecting from the outer curved surface of the coupling, whereat the diameter thereof begins to diminish, to form a shoulder between the end of the harrow-beam A and the side of the cross-beam A'. The part B' furnishes a lateral bearing for the inner face of the cross-beam A', which has a hole $A^8$ therein to admit the diminished portion of the coupling B.

D is a washer furnishing a lateral bearing for the outer face of the cross-beam A'.

E is a headed bolt passed through the coupling B and washer D and provided with a nut E' turned thereon to secure the same together. Obviously the diminished portion of the coupling B may have the outer end thereof produced so as to form an integral projection $B^2$, threaded exteriorly to receive a nut $E^2$ or provided with a linchpin $E^3$, to secure the cross-beam A' and washer D thereon, to serve in lieu of the bolt E, without departing from the spirit and scope of my invention.

I claim—

1. In a harrow, in combination, the tubular harrow-beam, the cylindrical tubular coupling of diminished diameter at its outer end rigidly secured to the end of said harrow-beam by means of a rivet passed therethrough, provided with a transverse annular flange projecting from the outer curved surface of said coupling, whereat the diameter thereof begins to diminish, the cross-beam having the diminished portion of the coupling inserted through a hole therein, the washer, the headed bolt and the nut for securing all of said parts operatively together, substantially as and for the purpose specified.

2. In a harrow, in combination, the tubular harrow-beams, the cylindrical tubular couplings of diminished diameter at their outer ends and riveted upon the ends of said harrow-beams, provided with tranverse annular flanges projecting from the outer curved surfaces of said couplings, whereat their dimensions begin to diminish, the cross-beams having the diminished portions of the couplings inserted through transverse holes therein, the washers, the headed bolts and nuts for securing all of said parts operatively together, the tilting beam, the standards connecting the tilting beam with the harrow-beams, the segment-rack rigidly secured to the tilting beam, the tilting lever fast to one of the harrow-beams and having detent connection with the segment-rack, substantially as and for the purpose specified.

JOHN PEHRSON.

Witnesses:
L. L. MORRISON,
E. F. DOWLING.